US011410437B2

(12) United States Patent
Yamamoto

(10) Patent No.: US 11,410,437 B2
(45) Date of Patent: Aug. 9, 2022

(54) SYSTEM AND METHOD FOR REMOVING FALSE POSITIVES DURING DETERMINATION OF A PRESENCE OF AT LEAST ONE REAR SEAT PASSENGER

(71) Applicant: Honda Motor Co., Ltd., Toyko (JP)

(72) Inventor: Stuart Masakazu Yamamoto, La Mirada, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 110 days.

(21) Appl. No.: 15/852,759

(22) Filed: Dec. 22, 2017

(65) Prior Publication Data
US 2019/0102635 A1 Apr. 4, 2019

Related U.S. Application Data

(60) Provisional application No. 62/567,988, filed on Oct. 4, 2017.

(51) Int. Cl.
G06V 20/59 (2022.01)
B60R 1/00 (2022.01)
G06V 20/52 (2022.01)

(52) U.S. Cl.
CPC ............ G06V 20/593 (2022.01); B60R 1/00 (2013.01); G06V 20/52 (2022.01); B60R 2300/70 (2013.01); B60R 2300/8006 (2013.01)

(58) Field of Classification Search
CPC ............... B60R 1/00; B60R 2300/70; B60R 2300/8006; G06K 9/00771; G06K 9/00838
See application file for complete search history.

(56) References Cited

U.S. PATENT DOCUMENTS

| 7,378,979 | B2 | 5/2008 | Rams, Jr. |
| 8,493,201 | B2 | 7/2013 | Orbach |
| 9,019,380 | B2 | 4/2015 | Schenken et al. |
| 9,270,809 | B2 | 2/2016 | Allen et al. |
| 9,305,463 | B1* | 4/2016 | Yellambalase ... H04N 21/42203 |
| 9,403,437 | B1 | 8/2016 | McDonald et al. |
| 9,446,770 | B2* | 9/2016 | Valeri ............... B60W 50/0098 |
| 9,522,631 | B2* | 12/2016 | Kleinert ................... B60Q 9/00 |
| 9,616,902 | B2 | 4/2017 | Park et al. |
| 9,628,609 | B2 | 4/2017 | Allen et al. |
| 9,630,496 | B2* | 4/2017 | Cuddihy .................. B60N 2/00 |
| 9,754,484 | B2 | 9/2017 | Schenken |
| 2002/0161501 | A1* | 10/2002 | Dulin .................... B06B 1/0215 |
| | | | 701/45 |

(Continued)

Primary Examiner — Gelek W Topgyal
(74) Attorney, Agent, or Firm — Rankin, Hill & Clark LLP

(57) ABSTRACT

A system and method for removing false positives during determination of a presence of at least one rear seat passenger of a vehicle that include activating an image system to capture images of rear seats of the vehicle to determine the presence of the at least one rear seat passenger. The system and method additionally include deactivating the image system to cease capturing images of the rear seats of the vehicle. The system and method also include reactivating the image system to capture images of the rear seats of the vehicle to determine the presence of the at least one rear seat passenger. The system and method further include presenting a user interface notification that includes a video feed of the rear seats of the vehicle based on the determined presence of the at least one rear seat passenger.

20 Claims, 6 Drawing Sheets

(56) References Cited

U.S. PATENT DOCUMENTS

| | | | |
|---|---|---|---|
| 2008/0048886 A1* | 2/2008 | Brown | G08G 1/0175 |
| | | | 340/937 |
| 2011/0074565 A1* | 3/2011 | Cuddihy | B60N 2/002 |
| | | | 340/457 |
| 2012/0020641 A1* | 1/2012 | Sakaniwa | G11B 27/105 |
| | | | 386/230 |
| 2012/0050021 A1 | 3/2012 | Rao et al. | |
| 2012/0093362 A1 | 4/2012 | Liu et al. | |
| 2012/0154136 A1 | 6/2012 | Connelly, Jr. | |
| 2016/0042616 A1 | 2/2016 | Dorsey | |
| 2016/0144781 A1* | 5/2016 | Kleinert | B60Q 9/00 |
| | | | 701/36 |
| 2016/0379466 A1* | 12/2016 | Payant | G08B 21/24 |
| | | | 340/457 |
| 2017/0043783 A1* | 2/2017 | Shaw | B60H 1/00978 |
| 2017/0109987 A1* | 4/2017 | Auvenshine | B60R 21/01516 |
| 2017/0124848 A1 | 5/2017 | Zhou | |
| 2017/0154513 A1* | 6/2017 | Hariri | B60N 2/002 |
| 2018/0265020 A1* | 9/2018 | Aoyagi | B60N 2/002 |

\* cited by examiner

SYSTEM AND METHOD FOR REMOVING FALSE POSITIVES DURING DETERMINATION OF A PRESENCE OF AT LEAST ONE REAR SEAT PASSENGER

This application claims priority to U.S. Provisional Application Ser. No. 62/567,988 filed on Oct. 4, 2017, which is expressly incorporated herein by reference.

BACKGROUND

Image based passenger detection systems that capture images of rear seat passengers within a vehicle may incur an issue of detecting false positives that are captured within a vehicle as the vehicle is driven. The false positives may be captured based on a movement of objects that are found within an external environment of the vehicle. In particular, the false positives may be captured through one or more windows of the vehicle as the vehicle is being driven and is in a state of movement. The false positives may provide an inaccurate detection of a presence of passengers within a vehicle.

BRIEF DESCRIPTION

According to one aspect, a computer-implemented method for removing false positives during determination of a presence of at least one rear seat passenger of a vehicle that includes activating an image system to capture images of rear seats of the vehicle to determine the presence of the at least one rear seat passenger. The method also includes deactivating the image system to cease capturing images of the rear seats of the vehicle. Deactivating of the image system occurs when the vehicle is determined to be taken out of a park transmission mode. The method additionally includes reactivating the image system to capture images of the rear seats of the vehicle to determine the presence of the at least one rear seat passenger. Reactivating the image system occurs when the vehicle is determined to be stopped for a predetermined period of time. The method further includes presenting a user interface notification that includes a video feed of the rear seats of the vehicle based on the determined presence of the at least one rear seat passenger.

According to another aspect, a system for removing false positives during determination of a presence of at least one rear seat passenger of a vehicle that includes a memory storing instructions when executed by a processor cause the processor to activate an image system to capture images of rear seats of the vehicle to determine the presence of the at least one rear seat passenger. The instructions also cause the processor to deactivate the image system to cease capturing images of the rear seats of the vehicle. Deactivating of the image system occurs when the vehicle is determined to be taken out of a park transmission mode. The instructions additionally cause the processor to reactivate the image system to capture images of the rear seats of the vehicle to determine the presence of the at least one rear seat passenger. Reactivating the image system occurs when the vehicle is determined to be stopped for a predetermined period of time. The instructions further cause the processor to present a user interface notification that includes a video feed of the rear seats of the vehicle based on the determined presence of the at least one rear seat passenger.

According to still another aspect, a computer readable storage medium storing instructions that when executed by a computer, which includes at least a processor, causes the computer to perform a method that includes activating an image system to capture images of rear seats of a vehicle to determine a presence of at least one rear seat passenger. The instructions also include deactivating the image system to cease capturing images of the rear seats of the vehicle. Deactivating of the image system occurs when the vehicle is determined to be taken out of a park transmission mode. The instructions additionally include reactivating the image system to capture images of the rear seats of the vehicle to determine the presence of the at least one rear seat passenger. Reactivating the image system occurs when the vehicle is determined to be stopped for a predetermined period of time. The instructions further include presenting a user interface notification that includes a video feed of the rear seats of the vehicle based on the determined presence of the at least one rear seat passenger.

DETAILED DESCRIPTION

Figure 1:
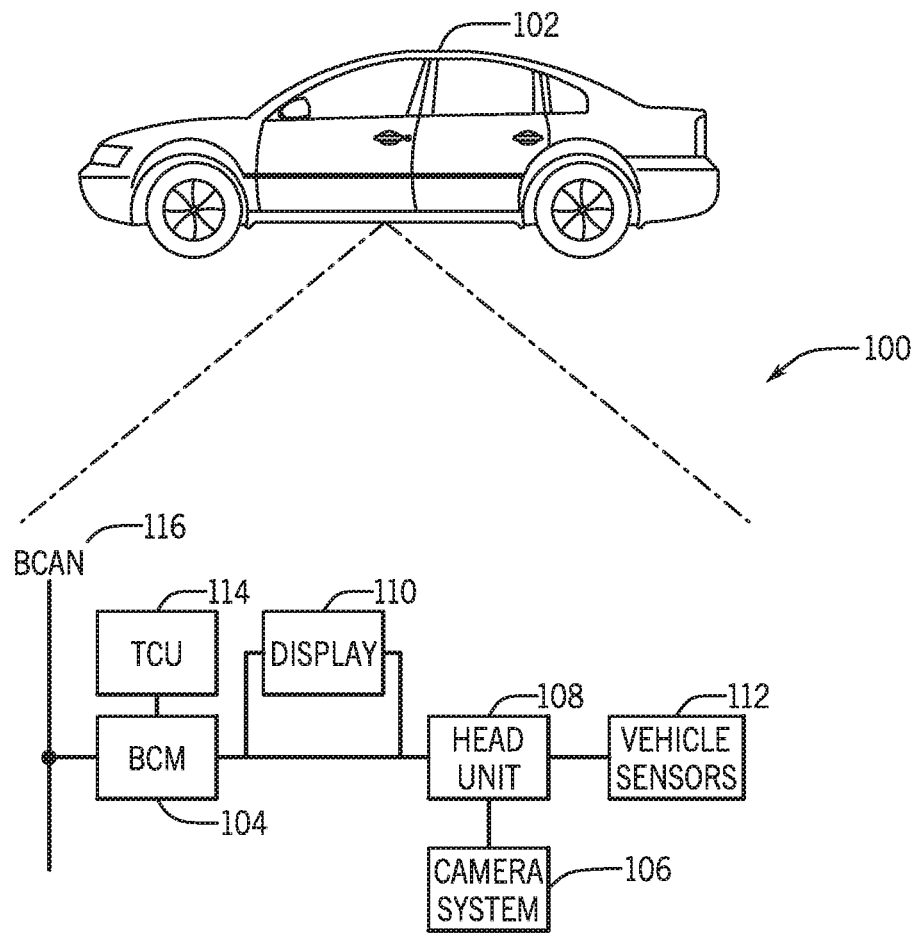
FIG. 1 is a schematic view of an operating environment of a rear seat monitoring system (RSM system) for reminding a driver of a presence of one or more passengers within a vehicle according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x."

The systems and methods described herein may be utilized to provide a rear seat monitoring system (RSM system) in a vehicle to remind a driver of a vehicle of a possible presence of one or more passengers (i.e., non-driver occupants) that may be located within one or more rear seats of the vehicle. The system and methods described herein selectively activate and deactivate the RSM system to utilize a camera system to capture images/video of an interior cabin space of the vehicle that include the rear seats of the vehicle to alleviate the detection of false positives (e.g., false positive data) based on the movement of objects that are found within the external environment of the vehicle. The false positives include false positive determinations of one or more passengers and/or one or more objects that are determined based on the analysis of images/video that include the captured movement of objects (e.g., individuals, cars, road signs, buildings) that are captured through one or more windows of the vehicle as the vehicle is being driven and is in a state of movement. In other words, the movement of objects that are captured through one or more windows of the vehicle within the images/video may cause false positives with respect to the determination that one or more rear seat passengers and/or objects may be causing the movement in order to determine the presence of the one or more passengers and/or the one or more objects within one or more rear seats of the vehicle.

Figure 2:
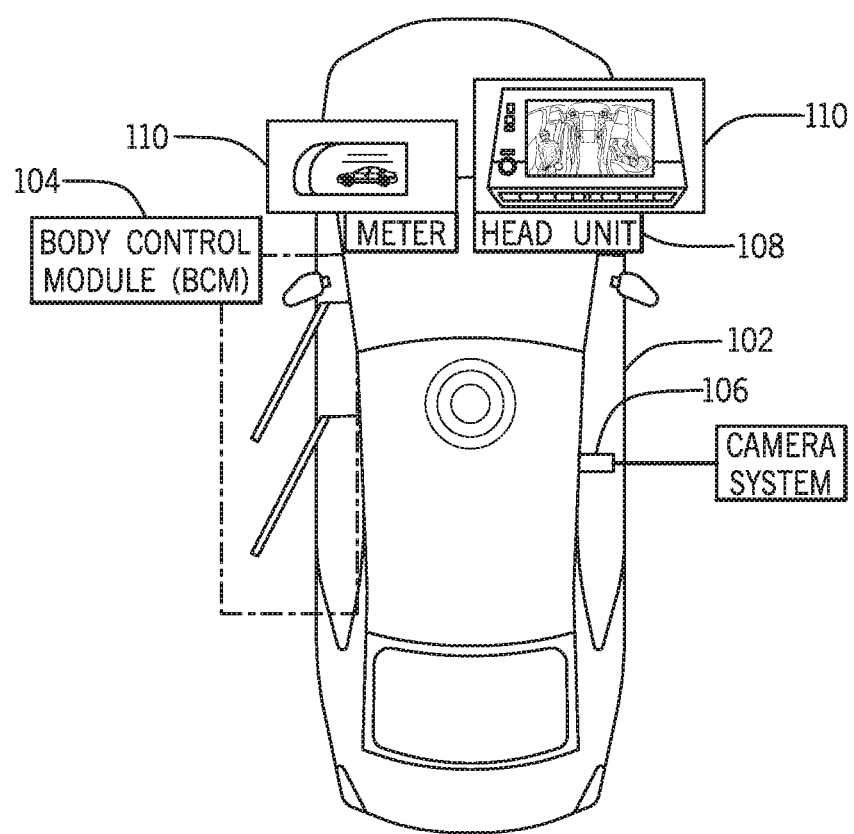
FIG. 2 is an illustrative view of an environment of the RSM system within the vehicle according to an exemplary embodiment of the present disclosure.

Referring now to the drawings, wherein the showings are for purposes of illustrating one or more exemplary embodiments and not for purposes of limiting the same, with reference to FIG. 1 and FIG. 2, the components of the RSM system 100 may be utilized to determine the presence of one or more rear seat passengers and/or objects within a vehicle 102 and to accordingly provide a respective alert to a driver of the vehicle 102. In an exemplary embodiment, the components of the RSM system 100 may include, but may not be limited to, a body control module (BCM) 104, a camera system 106, a head unit 108, a display 110, vehicle sensors 112, and a transmission control unit (TCU) 114. The components of the RSM system 100 may be operably connected to one another via a bus (BCAN) 116 controller area network that is included as an interconnected architecture that is operably connected to the components of the RSM system 100.

In an exemplary embodiment, the RSM system 100 may be activated or deactivated within the vehicle 102 based on the opening or closing of one or more rear doors (not shown) of the vehicle 102 and/or additional factors, as discussed below. Additionally, the RSM system 100 may be activated and deactivated based on a transmission mode of the vehicle 102. In particular, the RSM system 100 may be activated when the vehicle 102 is within a park transmission mode and may be deactivated when the vehicle 102 is taken out of the park transmission mode and put within another transmission mode (e.g., reverse or drive transmission mode) that causes movement of the vehicle 102. Additionally, once the vehicle 102 is determined to be taken out of the park transmission mode, the RSM system 100 may be activated and deactivated based on a stopping status of the vehicle 102. For example, the RSM system 100 may be activated when the vehicle 102 is determined to be stopped for a predetermined period of time (e.g., 15 seconds) when the vehicle 102 is within a drive transmission mode and may be deactivated when the vehicle 102 is determined to be moving (e.g., moving after being stopped at a traffic light).

In one embodiment, the BCM 104 may be operably connected to an electronic control unit (not shown) of the vehicle 102. The BCM 104 may execute instructions to cause a function or action via one or more components of the RSM system 100. The BCM 104 may include logic, a software controlled microprocessor, and a memory device containing executing instructions that may be utilized to store data. In one embodiment, the BCM 104 may communicate with the electronic control unit of the vehicle 102 to determine an ignition status of the vehicle 102 to further determine when the vehicle 102 is enabled (e.g., engine of the vehicle 102 is turned on) or disabled (e.g., engine of the vehicle 102 is turned off). As discussed below, the BCM 104 may receive data from one or more of the components of the RSM system 100 to provide the driver with a reminder/alert at an end of a trip to check the rear seats of the vehicle 102 where there is a possibility of a presence of one or more rear seat passengers (e.g., children, pets) and/or objects (e.g., packages) within the vehicle 102.

In one embodiment, during activation of the RSM system 100, the system 100 may utilize the camera system 106 to capture and provide video and/one or more still images of the interior cabin space of the vehicle 102 that includes the rear seats to the BCM 104 to be analyzed by the system 100 to determine the presence of one or more passengers and/or objects within the rear seats of the vehicle 102. The camera system 106 may include one or more cameras that are positioned within one or more locations within an interior portion of the vehicle 102. More specifically, the camera system 106 may include one or more cameras that are disposed within a rear portion of the vehicle 102 and are positioned to capture images towards an interior cabin space of the vehicle 102 that includes the rear seats of the vehicle 102. In some embodiments, the camera system 106 may be operably connected to one or more microphones (not shown) within the vehicle 102 that are utilized to capture audio within the interior cabin space of the vehicle 102.

In an exemplary embodiment, the camera system 106 may provide image data of video/images captured by the one or more cameras and audio data of audio provided by the one or more microphones to the BCM 104 to be analyzed to determine the possible existence of one or more rear seat passengers. In particular, in one embodiment, the image data and/or the audio data may be analyzed by the BCM 104 to determine movements and/or profiles (e.g., image profiles, sound profiles) that are used to determine the presence of the rear seat passenger(s)/object(s) within the vehicle 102.

The head unit 108 of the vehicle 102 may include internal processing memory, an interface circuit, and bus lines for transferring data, sending commands, and communicating with the components of the system 100. In one or more embodiments, the head unit 108 may execute one or more operating systems, applications, and/or interfaces that are associated to the vehicle 102. In one embodiment, the head unit 108 may be connected to an infotainment system (not shown) and may be operably connected to the display 110. In one embodiment, the display 110 may be positioned at a center console/center stack area of the vehicle 102 and may be physically associated with the head unit 108 to be viewed by the driver of the vehicle 102. In some configurations, the display 110 may additionally include a meter display (shown in FIG. 2) that is disposed at a dashboard (not shown) of the vehicle 102, and a head-up display that may be projected onto a windshield (not shown) and/or additional windows (not shown) of the vehicle 102.

The head unit 108 may act as an information hub of the vehicle 102 and may present information via the display 110. The head unit 108 may also be operably connected to internal speakers (not shown) to provide an audial warning alert (e.g., buzzer, chime) based on commands sent by the BCM 104. Additionally, the head unit 108 may also be operably connected to a horn (not shown) of the vehicle 102 to actuate the horn to provide a repetitive honk/beep notification based on commands sent by the BCM 104. As discussed below, the BCM 104 may present a rear seat interface to the driver of the vehicle 102 via the display 110 (e.g., display 110 on the head unit and/or meter display) to provide certain types of warnings and notifications to the driver of the vehicle 102 regarding a possible presence of the one or more rear seat passengers/objects within the vehicle 102 upon the vehicle 102 being placed within a park transmission mode. Additionally, the BCM 104 may present the rear seat interface via the display 110 to provide certain types of warnings and notifications to the driver of the vehicle 102 upon the vehicle 102 being disabled (e.g., ignition/engine of the vehicle 102 being turned off).

The vehicle sensors 112 may include, but may not be limited to, speed sensors, acceleration sensors, brake sensors, door sensors, door lock sensors, seat sensors, seat belt sensors, tire pressure sensors, and the like (individual sensors not shown). In one embodiment, the speed sensors, the acceleration sensors, and/or the brake sensors may provide vehicle speed data, vehicle acceleration data, and vehicle braking data to the BCM 104 to determine a speed of the vehicle 102, a stopped state of the vehicle 102, and/or when acceleration occurs to restart movement of the vehicle 102 from the stopped state.

As discussed below, the BCM 104 may activate the RSM system 100 to utilize the camera system 106 to capture video/images and provide respective image data to the BCM 104 to be analyzed to determine the presence of one or more rear seat passengers/objects within the vehicle 102 upon the BCM 104 determining that the vehicle 102 is in the stopped state for a predetermined period of time. The predetermined period of time may be based on a period of time that may be used to capture images of the rear seats of the vehicle 102 to be analyzed to determine the presence of one or more rear seat passenger/objects while minimizing capturing of the movement of objects outside of the vehicle 102 through the windows of the vehicle 102. Additionally, the BCM 104 may deactivate the RSM system 100 upon determining that the vehicle 102 is no longer in a stopped state and has accelerated to start moving from the stopped state.

In one embodiment, the door sensors may be configured to send data to the BCM 104 when one or more of the doors (not shown) of the vehicle 102 are opened and/or closed. In particular, the BCM 104 may receive data from the door sensors when one or more of the rear doors of the vehicle 102 are opened or closed prior to the vehicle 102 being enabled. If the door sensors detect that one or more of the rear doors of the vehicle 102 are opened of closed, respective data may be communicated to the BCM 104. In particular, upon detecting that one of the vehicle doors are opened and closed prior to the ignition of the vehicle 102 being enabled, the RSM system 100 may be activated and the BCM 104 may utilize the camera system 106 to capture video/images and provide respective image data to the BCM 104.

Upon capturing the video/images, as the BCM 104 receives the image data and audio data from the camera system 106, the BCM 104 may analyze the image data to determine the presence of one or more rear seat passengers/objects within the vehicle 102. The BCM 104 may additionally analyze audio data to detect any sounds associated with the presence of one or more rear seat passengers of the vehicle 102. In one embodiment, the BCM 104 may receive data from the door sensors to determine if a driver's door (not shown) of the vehicle 102 is opened/closed to determine deactivation of the rear seat interface to the driver. Additionally, as discussed below, the BCM 104 may receive data from the door sensors to determine if one or more of the rear doors of the vehicle 102 are opened to deactivate the RSM system 100 and/or provide one or more alerts/notifications to the driver of the vehicle 102.

In one embodiment, the door lock sensors may be configured to send data to the BCM 104 when one or more of the locks (not shown) of the doors of the vehicle 102 are locked and/or unlocked. In particular, the BCM 104 may receive data from the door lock sensors when one or more locks of the vehicle 102 are unlocked to initiate a process of determining activation of the RSM system 100. Additionally, the BCM 104 may receive data from the door lock sensors when one or more locks of the vehicle 102 are locked to deactivate the RSM system 100 after a predetermined period of time and/or provide one or more alerts to the driver of the vehicle 102.

In an exemplary embodiment, the TCU 114 of the vehicle 102 may be configured to send transmission mode data to the BCM 104 upon the changing of the transmission mode of the vehicle 102. For example, when the driver of the vehicle 102 uses a gear shifter (not shown) to change a transmission mode from the park transmission mode to another transmission mode (e.g., drive transmission mode), the TCU 114 may communicate respective data to the BCM 104. Additionally, when the driver of the vehicle 102 changes the transmission mode to the park transmission mode, the TCU 114 may communicate respective data to the BCM 104. As discussed below, the BCM 104 may activate the RSM system 100 to utilize the camera system 106 to capture video/images and provide respective image data to the BCM 104 to be analyzed to determine the presence of one or more rear seat passengers/objects within the vehicle 102 upon the BCM 104 determining that the vehicle 102 is in the park transmission mode. Additionally, the BCM 104 may deactivate the RSM system 100 upon determining that the vehicle 102 has been taken out of the park transmission mode and has been put into another transmission mode.

In one embodiment, upon analyzing the image data and audio data, the BCM 104 may determine if one or more rear seat passengers/objects are present or not present within the vehicle 102. Upon determining if one or more rear seat passengers/objects are present or not present within the vehicle 102, the BCM 104 may store a data flag that represents the determination or non-determination of the presence or non-presence of the one or more rear seat passengers/objects within its internal memory. In particular, the BCM 104 may store a detection indication data flag that indicates the determination that one or more rear seat passengers/objects are present within the vehicle 102. Alternatively, the BCM 104 may store a non-detection indication data flag that indicates the determination that one or more rear seat passengers/objects are not present within the vehicle 102.

More specifically, if the BCM 104 does determine the presence of one or more rear seat passengers/objects in the vehicle 102, the BCM 104 may store the detection indication data flag that includes the determined presence and a determined location of the one or more rear seat passengers/objects within the vehicle 102. For example, based on the analysis of the image data and audio data, if the BCM 104 detects the presence of a rear seat passenger(s)/object(s) on a left side rear seat of the vehicle 102, the BCM 104 may store the respective detection indication data flag to be further utilized. If it is determined that the presence of rear seat passenger(s)/object(s) is not present in the vehicle 102, the BCM 104 may similarly store a non-detection indication data flag that indicates that no rear seat passenger(s)/object(s) is determined to be present within the vehicle 102. In other words, the non-detection indication data flag may indicate that the rear seats of the vehicle 102 are unoccupied.

In one or more embodiments, upon the vehicle 102 being put into the park transmission mode from another transmission mode and/or upon the engine of the vehicle 102 being disabled, the electronic control unit may communicate respective data to the BCM 104. The BCM 104 may access the stored detection indication data flag or non-detection indication data flag regarding the presence or non-presence of one or more rear seat passengers/objects. Upon accessing the stored indication, the BCM 104 may send respective data to the head unit 108 to present the rear seat interface via the display 110. The BCM 104 may utilize the display 110 (including the meter display) to present the rear seat interface to the driver of the vehicle 102 upon determining that the vehicle 102 is put into the park transmission mode from another transmission mode and/or upon determining that the engine of the vehicle 102 has been disabled.

Figure 3:
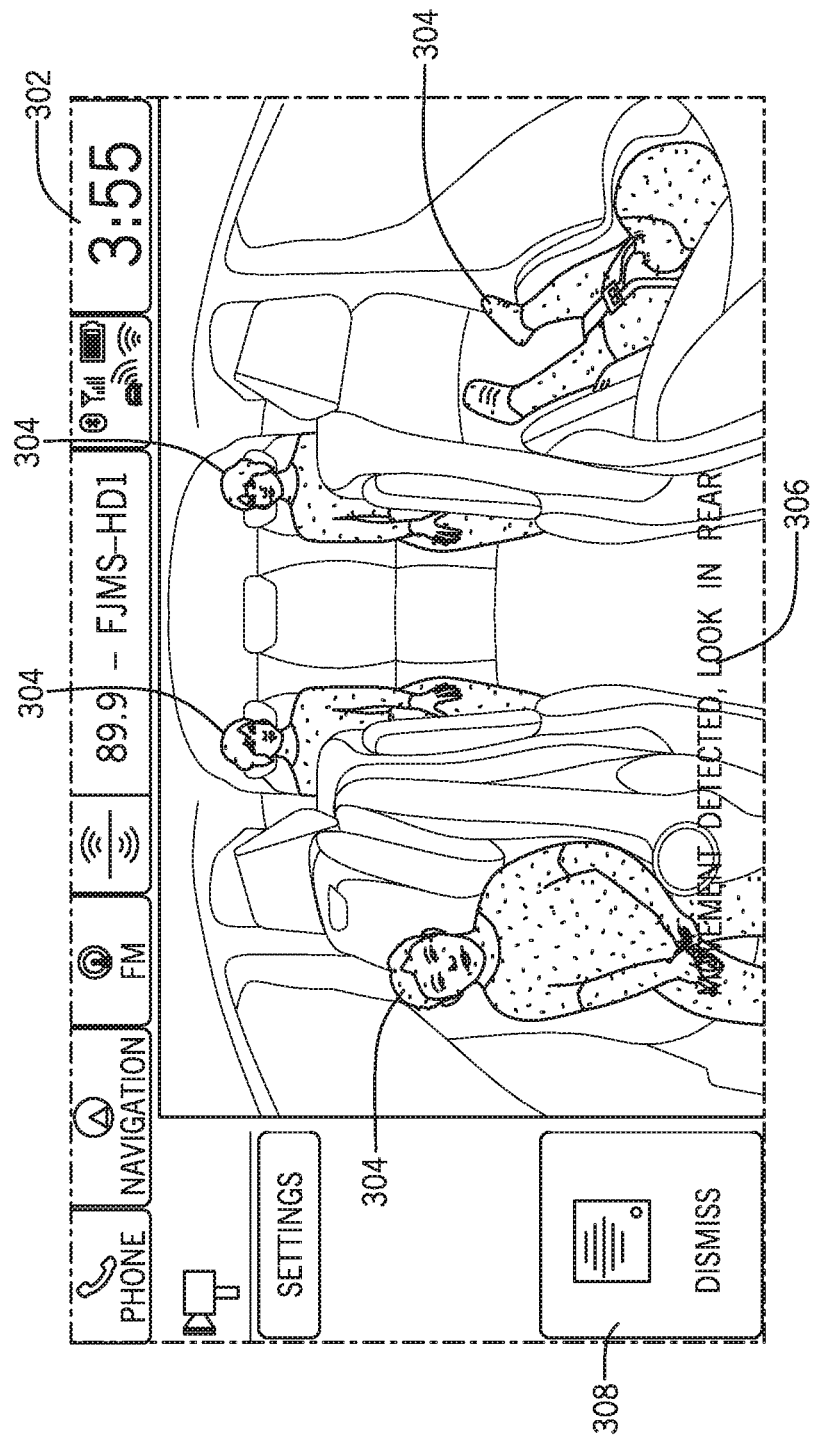
FIG. 3 is an illustrative example of a rear seat interface of the RSM system presented on a display unit according to an exemplary embodiment of the present disclosure.

In an exemplary embodiment, as shown in the illustrative example of FIG. 3, the rear seat interface 302 may be presented with a view of the interior cabin of the vehicle 102 that may include all of the rear seats of the vehicle 102. In the instance when the presence of one or more rear seat passengers/objects is detected in the vehicle 102, the rear seat interface 302 may be presented with an image/video feed of the interior cabin of the vehicle 102 as captured by the one or more cameras of the camera system 106. The image/video feed may be overlaid with one or more highlighted locations 304 that are presented at one or more of the rear seats where the presence of the one or more rear seat passengers/objects is detected (as stored within the detection indication data flag) by the BCM 104.

The image/video feed may also be overlaid with one or more user interface warning notifications 306 that pertain to the detected rear seat passengers/objects. Such warning notifications may be presented differently based on the detection of rear seat passengers as oppose to rear seat objects. Additionally, such warning notifications may be presented differently based on the detection of the presence of the one or more passengers/objects within the vehicle 102. For instance, when the presence of one or more rear seat passengers/objects is not detected in the vehicle 102, the rear seat interface 302 may provide one or more notifications to the driver of the vehicle 102 to generally check the surroundings of the interior cabin of the vehicle 102 for any possible passengers/objects. In some circumstances, a dismiss user interface input button 308 may be presented to the driver to allow the driver to dismiss the user interface warning notifications and deactivate the RSM system 100, thereby deactivating the presentation of the rear seat interface 302.

Upon presenting the rear seat interface 302, the BCM 104 may communicate with the door sensors to determine if a respective rear vehicle door(s) that is located near the one or more rear seats in which the presence of the rear seat passenger(s)/object(s) is detected is opened within a predetermined period of time. If is determined that respective rear vehicle door(s) are detected to be opened based on data sent from the door sensors, the one or more user interface warning notifications may also be disabled.

In one embodiment, if it is determined that the driver has not manually dismissed the user interface warning notification(s) by inputting the dismiss user interface input button presented on the rear seat interface 302, the respective rear vehicle door(s) are not detected to be opened within the predetermined period of time, and that one or more doors of the vehicle 102 are determined to be locked, the BCM 104 may utilize the head unit 108 to actuate the horn to provide the repetitive honk/beep notification. The honk/beep notification may be used to alert the driver of the vehicle 102 of the possible presence of the one or more rear seat passengers/objects of the vehicle 102 as the driver walks away from the vehicle 102 after locking the vehicle door(s).

Figure 4A:
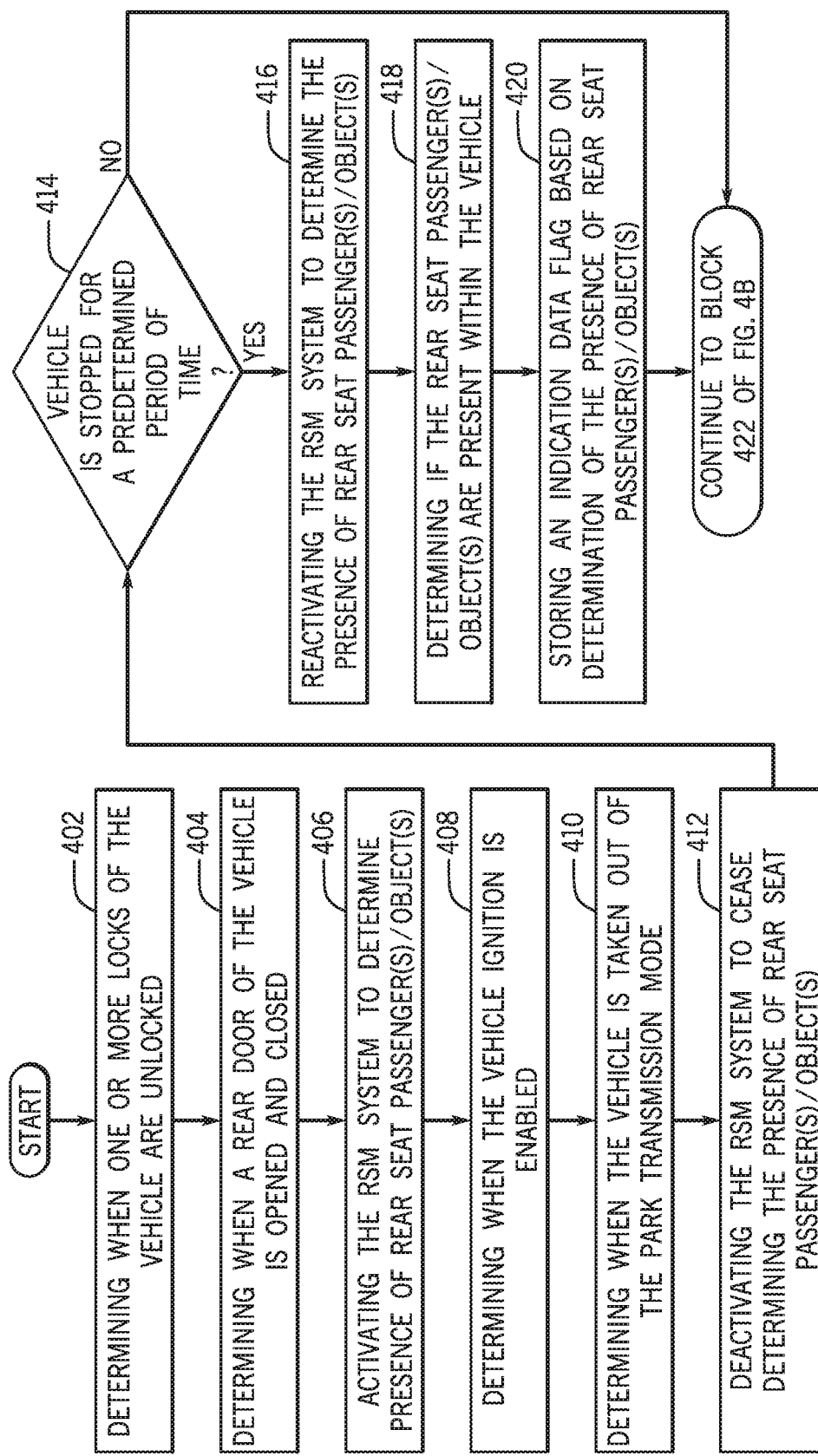
FIG. 4A is an illustrative process flow diagram of a first part of a method utilized to activate or deactivate the RSM system and to remind the driver of the vehicle of a possible presence of one or more rear seat passengers/objects within the vehicle according to an exemplary embodiment of the present disclosure.

FIG. 4A is an illustrative process flow diagram of a first part of a method 400 utilized to activate or deactivate the RSM system 100 and to remind a driver of the vehicle 102 of a possible presence of one or more rear seat passengers/objects within the vehicle 102 according to an exemplary embodiment of the present disclosure. The method 400 of FIG. 4A will be described with reference to the components of FIG. 1 and FIG. 2, though it is to be appreciated that the method 400 of FIG. 4A may be used with other systems and/or components. The method 400 may begin at block 402, wherein the method 400 may include determining when one or more locks of the vehicle 102 are unlocked. In one embodiment, the door lock sensors of the vehicle sensors 112 may communicate data to the BCM 104 when a lock status of the one or more locks of the vehicle 102 change from a locked status to an unlocked status or from an unlocked status to a locked status. Therefore, if the driver or passenger(s) of the vehicle 102 unlocks one or more locks of the vehicle 102, the BCM 104 determines that the one or more locks of the vehicle 102 are unlocked.

The method 400 may proceed to block 404, wherein the method 400 may include determining when a rear door of the vehicle 102 is opened and closed. In one embodiment, the one or more of the rear doors of the vehicle 102 may be determined to be opened by the BCM 104 based on data provided by the door sensors of the vehicle sensors 112. Upon determining that one or more of the rear doors of the vehicle 102 are opened, the BCM 104 may initiate a trigger to further communicate with the door sensors to determine when the one or more of the rear doors of the vehicle 102 are subsequently closed. Upon receiving data regarding the closure of the one or more rear doors of the vehicle 102 from the door sensors, the BCM 104 may determine that the rear door of the vehicle 102 is closed.

The method 400 may proceed to block 406, wherein the method 400 may include activating the RSM system 100 to determine the presence of rear seat passenger(s)/object(s). Upon the BCM 104 determining the rear door(s) of the vehicle 102 had been closed, the BCM 104 may activate the RSM system 100 and thereby activate the camera system 106. Upon activation of the camera system 106, the one or more cameras of the camera system 106 may be utilized to capture video/images and provide respective image data to the BCM 104. Additionally, audio data may be provided by the camera system 106 to the BCM 104. As discussed above, image data and/or audio data may be analyzed by the BCM 104 to determine if rear seat passenger(s)/object(s) are present within the vehicle 102.

In one embodiment, if the BCM 104 determines that the rear seat passenger(s)/object(s) are present within the vehicle 102 based on the analysis of the image data and/or the audio data, the BCM 104 may store the detection indication data flag that includes the detected presence and a detected location of the one or more rear seat passengers/objects within the vehicle 102. In some embodiments, upon storing the detection indication data flag, the RSM system 100 may be deactivated until a point in time when it is determined that the vehicle 102 is put into the park transmission mode (discussed below with respect to block 422).

The method 400 may proceed to block 408, wherein the method 400 may include determining when the vehicle ignition is enabled. As discussed, the BCM 104 may communicate with the electronic control unit of the vehicle 102 to determine when the ignition status of the vehicle 102 is changed from a disabled state to an enabled state. Consequently, when the driver of the vehicle 102 uses a push button (not shown) or key ignition (not shown) to enable the engine of the vehicle 102, the BCM 104 may determine that the vehicle ignition is enabled.

The method 400 may proceed to block 410, wherein the method 400 may include determining when the vehicle 102 is taken out of the park transmission mode. In one embodiment, the TCU 114 of the vehicle 102 may communicate with the BCM 104 when the transmission mode of the vehicle 102 is changed. In particular, when the driver of the vehicle 102 uses the gear shifter to change the transmission mode from the park transmission mode to another transmission mode (e.g., reverse transmission mode, drive transmission mode), the TCU 114 may communicate respective data to the BCM 104. The BCM 104 may responsively determine that the vehicle 102 is taken out of the park transmission mode.

The method 400 may proceed to block 412, wherein the method 400 may include deactivating the RSM system 100 to cease determining the presence of rear seat passenger(s)/object(s). In an exemplary embodiment, upon the BCM 104 determining that the vehicle 102 is no longer within the park transmission mode and that the vehicle 102 may be moved, the BCM 104 may deactivate the RSM system 100. Upon deactivation of the RSM system 100, the camera system 106 may also be deactivated to ensure that the camera system 106 may no longer be utilized to capture video/images and provide respective image data to the BCM 104. The deactivation of the RSM system 100 may alleviate the detection of false positives since image data is not analyzed that may represent images/video that include the movement of objects that are found within the external environment of the vehicle 102 as the vehicle 102 is in a state of movement.

The method 400 may proceed to block 414, wherein the method 400 may include determining if the vehicle 102 is stopped for a predetermined period of time. In an exemplary embodiment, upon the vehicle 102 being taken out of the park transmission mode and driven, the brake sensors and/or the speed sensors of the vehicle sensors 112 may communicate data to the BCM 104 when the brake sensors and/or the speed sensors sense that the vehicle 102 has stopped. As an illustrative example, the brake sensors and/or the speed sensors may provide indication to the BCM 104 that the vehicle 102 has been stopped when the vehicle 102 reaches an intersection and is stopped for a traffic light.

In one embodiment, upon the BCM 104 determining that the vehicle 102 is stopped, the BCM 104 may utilize a timer (not shown) to determine if the vehicle 102 is stopped for a predetermined period of time (e.g., 15 seconds). As discussed, the predetermined period of time may be based on a period of time that may be used to capture images of the rear seats of the vehicle 102 to be analyzed to determine the presence of one or more rear seat passenger/objects while minimizing the capturing of any movement of objects outside of the vehicle 102 through the windows of the vehicle 102. With reference to the aforementioned illustrative example, if the vehicle 102 is stopped at the traffic intersection for at least the predetermined period of time of 15 seconds, the BCM 104 may determine that the vehicle 102 is stopped for the predetermined period of time.

If it is determined that the vehicle 102 is stopped for the predetermined period of time (at block 414), the method 400 may proceed to block 416, wherein the method 400 may include reactivating the RSM system 100 to determine the presence of rear seat passenger(s)/object(s) within the vehicle 102. Upon the BCM 104 determining the vehicle 102 is in the stopped state for the predetermined period of time, the BCM 104 may re-activate the RSM system 100 and thereby re-activate the camera system 106 to capture video/images and provide respective image data to the BCM 104. Additionally, audio data of audio provided by the one or more microphones may again be provided to the BCM 104. As discussed above, image data and/or audio data may be analyzed by the BCM 104 to determine if rear seat passenger(s)/object(s) are present within the vehicle 102.

The method 400 may proceed to block 418, wherein the method 400 may include determining if the rear seat passenger(s)/object(s) are present within the vehicle 102. In one embodiment, the BCM 104 may determine if the rear seat passenger(s)/object(s) are present within the vehicle 102 based on the analysis of the image data and/or the audio data provided to the BCM 104. Upon analyzing the image data and/or the audio data, if the BCM 104 determines the presence of the rear seat passenger(s)/object(s) within the vehicle 102, the BCM 104 may determine the location of the one or more rear seat passengers/objects within the vehicle 102.

The method 400 may proceed to block 420, wherein the method 400 may include storing an indication data flag based on the presence of rear seat passenger(s)/object(s) within the vehicle 102. In one embodiment, if the BCM 104 determines that the rear seat passenger(s)/object(s) are present in the vehicle 102 (at block 418), the BCM 104 may store the detection indication data flag within its internal memory that includes the determined presence and a determined location of the rear seat passenger(s)/object(s) within the vehicle 102. Conversely, if the BCM 104 determines that there are no rear seat passenger(s)/object(s) present within the vehicle 102 (at block 418), the BCM 104 may store the non-detection indication data flag within its internal memory that indicates that no rear seat passenger/object is determined to be present within the vehicle 102.

Figure 4B:
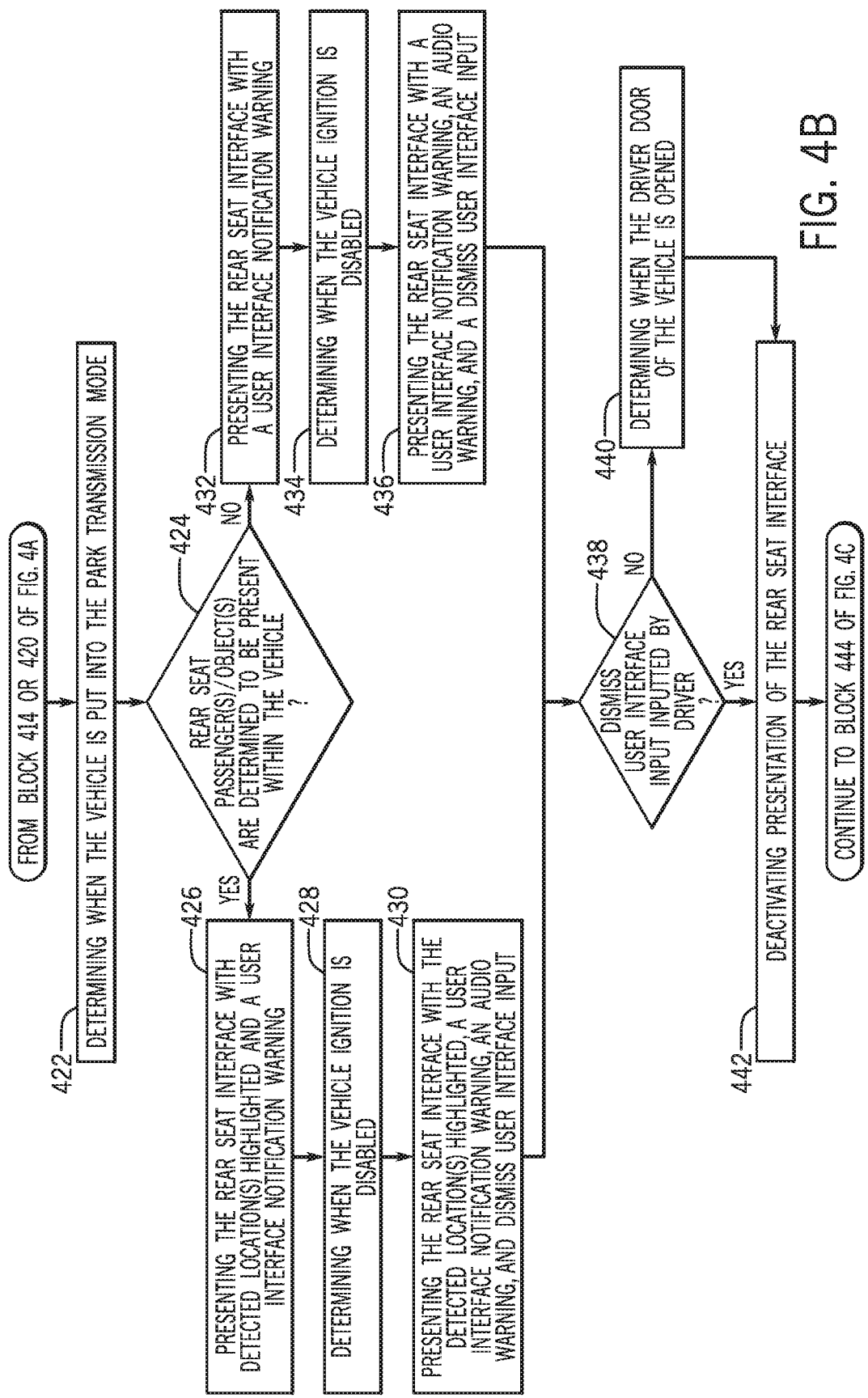
FIG. 4B is an illustrative process flow diagram of a second part of the method utilized to activate or deactivate the RSM system and to remind the driver of the vehicle of the possible presence of one or more rear seat passengers/objects within the vehicle according to an exemplary embodiment of the present disclosure.

FIG. 4B is an illustrative process flow diagram of a second part of the method 400 utilized to activate or deactivate the RSM system 100 and to remind a driver of the vehicle 102 of the possible presence of one or more rear seat passengers/objects within the vehicle 102 according to an exemplary embodiment of the present disclosure. The method 400 of FIG. 4B will be described with reference to the components of FIG. 1 and FIG. 2, though it is to be appreciated that the method 400 of FIG. 4B may be used with other systems and/or components.

Upon determining that the vehicle 102 is not stopped for the predetermined period of time (as discussed with respect to block 414 of FIG. 4A) or upon storing the indication data flag based on the determination of the presence of rear seat passenger(s)/object(s) (as discussed with respect to block 420 of FIG. 4A), the method 400 may proceed to block 422 of FIG. 4B, wherein the method 400 may include determining when the vehicle 102 is put into the park transmission mode. In one embodiment, the TCU 114 of the vehicle 102 may communicate with the BCM 104 when the transmission mode of the vehicle 102 is changed to the park transmission mode. In particular, when the driver of the vehicle 102 uses the gear shifter to change the transmission mode from the reverse or the drive transmission mode to the park transmission mode upon parking the vehicle 102, the TCU 114 may communicate respective data to the BCM 104. The BCM 104 may responsively determine that the vehicle 102 is put into the park transmission mode.

The method 400 may proceed to block 424, wherein the method 400 may include determining if the rear seat passenger(s)/object(s) are determined to be present within the vehicle 102. In one embodiment, upon the BCM 104 determining that the vehicle 102 is put into the park transmission mode, the BCM 104 may access its internal memory and may access the indication data flag previously stored by the BCM 104. Upon accessing the indication data flag, the BCM 104 may determine if the indication data flag is the detection indication data flag or the non-detection indication data flag. If the BCM 104 determines that the detection indication data flag was previously stored, the BCM 104 may access and analyze the data flag to determine that rear seat passenger(s)/object(s) are determined to be present within the vehicle 102. Additionally, the BCM 104 may analyze the data flag for the determined location(s) of the rear seat passenger(s)/object(s) within the vehicle 102. Conversely, if the BCM 104 determines that the non-detection indication data flag was previously stored, the BCM 104 may access and analyze the data flag to determine that rear seat passenger(s)/object(s) are not determined to be present within the vehicle 102. In other words, the BCM 104 may determine that the rear seats of the vehicle 102 are unoccupied based on the previously stored non-detection indication data flag.

If it is determined that rear seat passenger(s)/object(s) are determined to be present within the vehicle 102 (at block 424), the method 400 may proceed to block 426, wherein the method 400 may include presenting the rear seat interface with the determined location(s) where passenger(s)/object(s) are determined to be present as highlighted and a user interface warning notification. As discussed above, the BCM 104 may send respective data to the head unit 108 to present the rear seat interface via the display 110. In an exemplary embodiment, the BCM 104 may utilize the display 110 (that may include the meter display) to present the rear seat interface to the driver of the vehicle 102 with a user interface notification that includes text notifying the driver of the vehicle 102 that the presence of the passenger(s)/object(s) has been detected within the rear seats of the vehicle 102.

The rear seat interface may include the image/video feed of the interior cabin of the vehicle 102 that includes the rear seats of the vehicle 102 that may be overlaid with one or more highlighted locations that are presented at one or more of the rear seats where the presence of the one or more rear seat passengers/objects is detected based on the analysis of the detection indication data flag. The image/video feed of the interior cabin of the vehicle 102 may also be overlaid with one or more user interface warning notifications that pertain to the detected rear seat passengers/objects. In some embodiments, the rear seat interface may be presented with specific notifications pointing out other attributes within the vehicle 102 (e.g., car seats, seat belts, etc.)

The method 400 may proceed to block 428, wherein the method 400 may include determining when the vehicle ignition is disabled. As discussed, the BCM 104 may communicate with the electronic control unit of the vehicle 102 to determine when the ignition status of the vehicle 102 is changed from the enabled state to a disabled state. Therefore, when the driver of the vehicle 102 turns off the engine of the vehicle 102 (e.g., by using the push button or the key ignition) after driving and parking the vehicle 102, the BCM 104 may determine that the vehicle ignition is disabled.

The method 400 may proceed to block 430, wherein the method 400 may include presenting the rear seat interface with the detected location(s) highlighted, a user interface notification warning, an audio warning, and the dismiss user interface input. In one embodiment, the BCM 104 may send respective data to the head unit 108 to present the rear seat interface via the display 110. In an exemplary embodiment, the BCM 104 may utilize the display 110 (that may include the meter display) to present the rear seat interface to the driver of the vehicle 102 that may include a user interface notification that includes text notifying the driver of the vehicle 102 that the presence of the passenger(s)/object(s) has been detected within the rear seats of the vehicle 102. For example, the rear seat interface may include a user interface notification that includes the text "MOVEMENT DETECTED, LOOK IN THE REAR." The rear seat interface may include the image/video feed of the interior cabin of the vehicle 102 that includes the rear seats of the vehicle 102 that may be overlaid with one or more highlighted locations that are presented at one or more of the rear seats where the presence of the one or more rear seat passengers/objects is detected based on the analysis of the detection indication data flag.

The image/video feed of the interior cabin of the vehicle 102 may also be overlaid with one or more user interface warning notifications that pertain to the detected rear seat passengers/objects. The BCM 104 may additionally utilize the head unit 108 to actuate the internal speakers of the vehicle 102 to provide the audial warning alert (e.g., buzzer, chime) to alert the driver of the vehicle 102 of the possible presence of the one or more rear seat passengers/objects within the vehicle 102. The BCM 104 may additionally present the dismiss user interface input button to the driver to provide an option to dismiss the user interface warning notifications and cease presentation of the rear seat interface.

Referring again to block 424 of the method 400, if it is determined that the rear seat passenger(s)/object(s) are not determined to be present within the vehicle 102 (at block 424), the method 400 may proceed to block 432, wherein the method 400 may include presenting the rear seat interface with a user interface notification warning. In one embodiment, the BCM 104 may send respective data to the head unit 108 to present the rear seat interface via the display 110. In an exemplary embodiment, the BCM 104 may utilize the display 110 (that may include the meter display) to present the rear seat interface to the driver of the vehicle 102 that includes a video/image feed of the cabin of the vehicle 102 that may include all of the rear seats of the vehicle 102 as captured by the one or more cameras of the camera system 106. The rear seat interface may additionally include a user interface notification that notifies the driver of the vehicle 102 to check the rear seats of the vehicle 102.

The method 400 may proceed to block 434, wherein the method 400 may include determining when the vehicle ignition is disabled. As discussed, the BCM 104 may communicate with the electronic control unit of the vehicle 102 to determine when the ignition status of the vehicle 102 is changed from the enabled state to a disabled state. Therefore, when the driver of the vehicle 102 turns off the engine of the vehicle 102 (e.g., by using the push button or the key ignition) after driving and parking the vehicle 102, the BCM 104 may determine that the vehicle ignition is disabled.

The method 400 may proceed to block 436, wherein the method 400 may include presenting the rear seat interface with a user interface notification warning, an audio warning, and a dismiss user interface input. In one embodiment, the BCM 104 may send respective data to the head unit 108 to present the rear seat interface via the display 110. In an exemplary embodiment, the BCM 104 may utilize the display 110 (that may include the meter display) to present the rear seat interface to the driver of the vehicle 102 with a user interface notification that includes text notifying the driver of the vehicle 102 to check the rear seats of the vehicle 102. For example, the user interface notification may include the text "LOOK IN THE REAR." The rear seat interface may include the image/video feed of the interior cabin of the vehicle 102 that includes the rear seats of the vehicle 102. The BCM 104 may additionally utilize the head unit 108 to actuate the internal speakers of the vehicle 102 to provide the audial warning alert (e.g., buzzer, chime) to alert the driver of the vehicle 102 of the possible presence of the rear seat passenger(s)/object(s) within the vehicle 102. The BCM 104 may additionally present the dismiss user interface input button to the driver to provide the option to dismiss the user interface warning notifications and cease presentation of the rear seat interface.

Upon presenting the rear seat interface (as discussed above with respect to block 430 or block 436), the method 400 may proceed to block 438, wherein the method 400 may include determining if the dismiss user interface input is inputted by the driver. As discussed above, the rear seat interface may be presented with the dismiss user interface input (at block 430 and 436) that may be inputted to allow the driver to dismiss the user interface notification warning(s) and audio warning(s) provided to the driver to alert the driver to check the rear portion of the vehicle 102. In one embodiment, upon receiving an input by the driver on the dismiss user interface input, the head unit 108 may communicate respective data associated with the received input to the BCM 104. If the input is not received by the driver on the dismiss user interface input, the head unit 108 may not communicate respective data associated with the received input to the BCM 104. In an exemplary embodiment, the BCM 104 may determine that the dismiss user interface input is inputted by the driver based on the receipt of the respective data associated with the input from the head unit 108. Alternatively, the BCM 104 may determine that the dismiss user interface input is not inputted by the driver when respective data associated with the input from the head unit 108 is not received by the BCM 104.

If it is determined that the dismiss user interface input is not inputted by the driver (at block 438), the method 400 may proceed to block 440, wherein the method 400 may include determining when the driver door of the vehicle 102 is opened. The driver door of the vehicle 102 may be determined to be opened by the BCM 104 based on data provided by the door sensors of the vehicle sensors 112.

If it is determined that the dismiss user interface input is inputted by the driver (at block 438) or upon determining when the driver door of the vehicle is opened (at block 440), the method 400 may proceed to block 442, wherein the method 400 may include deactivating presentation of the rear seat interface. In one embodiment, when it is determined that the driver has inputted the dismiss user interface input, the BCM 104 may cease presentation of the rear seat interface on the display 110. Alternatively, if it is determined that the driver has not inputted the dismiss user interface input (at block 438) and the BCM 104 determines that the driver door of the vehicle 102 is opened (at block 440), the BCM 104 may cease presentation of the rear seat interface on the display 110.

Figure 4C:
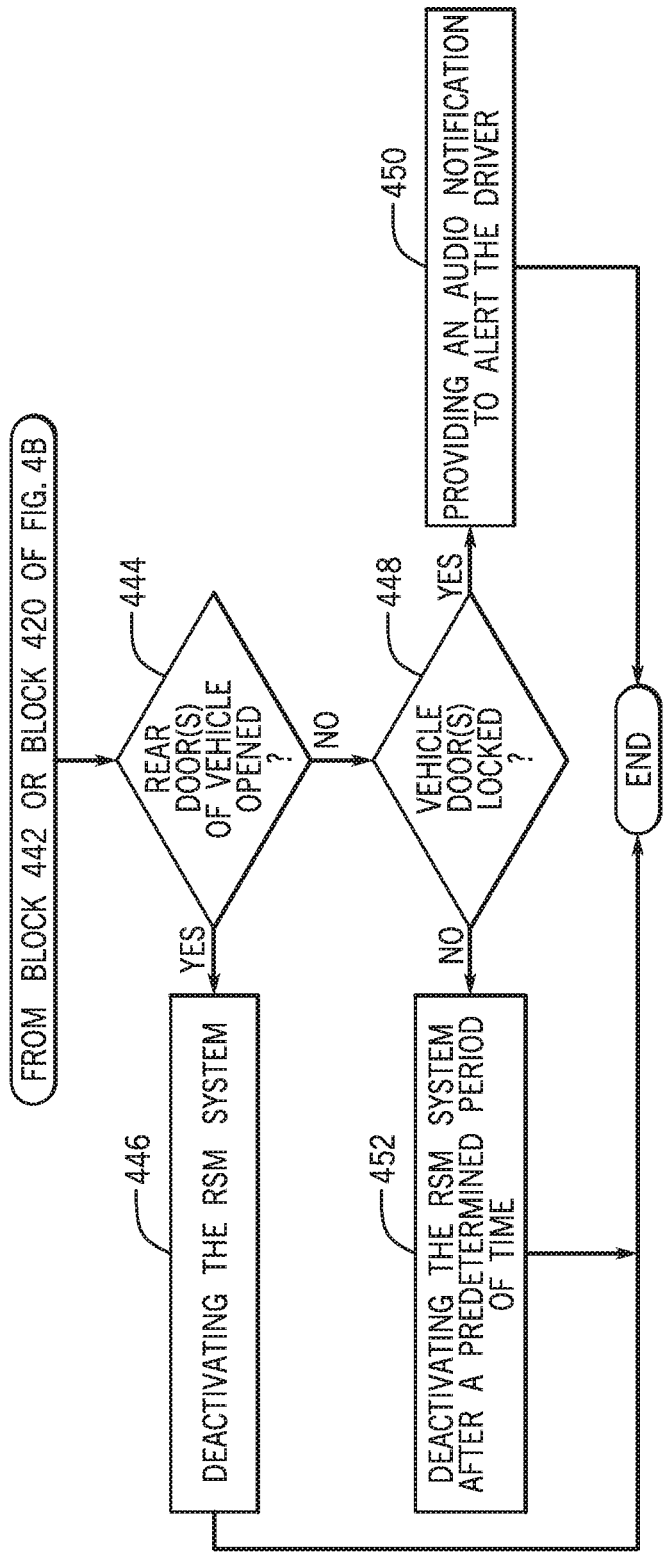
FIG. 4C is an illustrative process flow diagram of a third part of the method utilized to activate or deactivate the RSM system and to remind the driver of the vehicle of the possible presence of one or more rear seat passengers/objects within the vehicle according to an exemplary embodiment of the present disclosure.

FIG. 4C is an illustrative process flow diagram of a third part of the method 400 utilized to activate or deactivate the RSM system 100 and to remind a driver of the vehicle 102 of the possible presence of one or more rear seat passengers/objects within the vehicle 102 according to an exemplary embodiment of the present disclosure. The method 400 of FIG. 4B will be described with reference to the components of FIG. 1 and FIG. 2, though it is to be appreciated that the method 400 of FIG. 4B may be used with other systems and/or components.

Upon deactivating presentation of the rear seat interface (as discussed with respect to block 442 of FIG. 4B), the method 400 may proceed to block 444, wherein the method 400 may include determining if the rear door(s) of the vehicle 102 is opened. As discussed, one or more of the rear doors of the vehicle 102 may be determined to be opened by the BCM 104 based on data provided by the door sensors of the vehicle sensors 112.

If it is determined that the rear door(s) of the vehicle 102 is opened (at block 444), the method 400 may proceed to block 446, wherein the method 400 includes deactivating the RSM system 100. In an exemplary embodiment, upon the BCM 104 determining that one or more of the rear doors of the vehicle 102 are opened, the BCM 104 may deactivate the RSM system 100. Upon deactivation of the RSM system 100, the camera system 106 may also be deactivated to ensure that the camera system 106 may no longer be utilized to capture video/images and provide respective image data and/or audio data to the BCM 104. Upon opening of the rear door(s) of the vehicle 102, the passenger(s)/object(s) may exit/be removed from the vehicle 102.

If it is determined that the rear door(s) of the vehicle 102 are not opened (at block 444), the method 400 may proceed to block 448 wherein the method 400 may include determining if the vehicle door(s) is locked. Upon determining that the rear door(s) of the vehicle 102 are not opened after the driver has opened the driver door or the driver has inputted the dismiss user interface input, the BCM 104 may communicate with the door lock sensors to determine if one or more of the vehicle doors are locked. The door lock sensors of the vehicle sensors 112 may communicate data to the BCM 104 when a lock status of the one or more locks of the vehicle 102 change from the unlocked status to a locked status based on an inputting of a lock button(s) (not shown) of the vehicle 102, vehicle doors, and/or a portable device(s) (e.g., key fob) (not shown) associated with the vehicle 102. Therefore, if the driver or passenger(s) of the vehicle 102 locks one or more locks of the vehicle 102, the BCM 104 determines that one or more locks of the vehicle 102 are locked.

If it is determined that the vehicle door(s) is locked (at block 448), the method 400 may proceed to block 450 wherein the method 400 may include providing an audio notification to alert the driver. In an exemplary embodiment, the BCM 104 may utilize the head unit 108 to actuate the horn to provide repetitive honk/beep notifications. The honk/beep notifications may be used to alert the driver of the vehicle 102 of the possible presence of the one or more rear seat passengers/objects of the vehicle 102 as the driver walks away from the vehicle 102 after locking the vehicle door(s).

If it is determined that the vehicle door(s) is not locked (at block 448), the method 400 may proceed to block 452, wherein the method 400 may include deactivating the RSM system 100 after a predetermined period of time. In one embodiment, upon the BCM 104 determining that vehicle door(s) are not locked by the driver or passenger(s), the BCM 104 may utilize the timer to determine if a predetermined period of time (e.g., 120 seconds) has elapsed. If the BCM 104 determines that the predetermined period of time has elapsed, the BCM 104 may deactivate the RSM system 100. Upon deactivation of the RSM system 100, the camera system 106 may also be deactivated to ensure that the camera system 106 may no longer be utilized to capture video/images and provide respective image data to the BCM 104. Upon opening of the rear door(s) of the vehicle 102, the passenger(s)/object(s) may exit/be removed from the vehicle 102.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for removing false positives during determination of a presence of at least one rear seat passenger of a vehicle, comprising:
   activating an image system to capture images of rear seats of the vehicle to determine the presence of the at least one rear seat passenger;
   deactivating the image system to cease capturing of images of the rear seats of the vehicle, wherein deactivating of the image system occurs when the vehicle is determined to be taken out of a park transmission mode;
   reactivating the image system to capture images of the rear seats of the vehicle to determine the presence of the at least one rear seat passenger, wherein reactivating the image system occurs when the vehicle is determined to be stopped for a predetermined period of time as the vehicle continues to be out of the park transmission mode, wherein a detection indication data flag that includes at least one determined location of the at least one rear seat passenger is stored based on data provided by the image system upon determining the vehicle is put into the park transmission mode from another transmission mode as the vehicle is enabled; and
   presenting a user interface notification that includes a video feed of the rear seats of the vehicle based on the determined presence of the at least one rear seat passenger, wherein the user interface notification is disabled upon determining that at least one rear vehicle door is opened within a predetermined period of time that is located near at least one seat in which the presence of the at least one rear seat passenger is detected based on an analysis of the detection indication flag.

2. The computer-implemented method of claim 1, wherein activating the image system occurs when the at least one rear door of the vehicle is determined to be opened and closed before an ignition of the vehicle is enabled.

3. The computer-implemented method of claim 1, wherein deactivating the image system includes ceasing the determination of the presence of the at least one rear seat passenger when the vehicle is taken out of the park transmission mode and the vehicle is in a state of movement.

4. The computer-implemented method of claim 1, further including deactivating the image system when it is determined that the vehicle is in a state of movement after the vehicle is determined to be stopped for the predetermined period of time.

5. The computer-implemented method of claim 1, further including storing the detection indication data flag when the presence of the at least one rear seat passenger is detected within the vehicle.

6. The computer-implemented method of claim 5, wherein presenting the user interface notification includes accessing the detection indication data flag upon determining that the vehicle is put in the park transmission mode and analyzing the detection indication data flag and determining that the at least one rear seat passenger is determined to be present within the vehicle.

7. The computer-implemented method of claim 6, wherein the video feed is presented with at least one rear seat of the vehicle as highlighted over at least one location where the at least one rear seat passenger is determined to be located, wherein the user interface notification also includes a user interface notification warning.

8. The computer-implemented method of claim 7, wherein it is determined that the ignition of the vehicle is disabled and the video feed is presented with the at least one rear seat of the vehicle as highlighted over at least one location where the at least one rear seat passenger is determined to be located, wherein the user interface notification also includes the user interface notification warning, an audio warning, and a dismiss user interface input that dismisses the user interface notification upon input.

9. The computer-implemented method of claim 5, further including storing a non-detection indication data flag when the presence of the at least one rear seat passenger is not detected within the vehicle, wherein the non-detection indication data flag is a different data flag than the detection indication data flag, wherein presenting the user interface notification includes determining that the rear seats of the vehicle are unoccupied based on retrieval of the non-detection indication data flag, wherein it is determined that the ignition of the vehicle is disabled and the video feed is presented to include the rear seats of the vehicle, wherein the user interface notification also includes a user interface notification warning, an audio warning, and a dismiss user interface input.

10. A system for removing false positives during determination of a presence of at least one rear seat passenger of a vehicle, comprising:
   a memory storing instructions when executed by a processor cause the processor to:
   activate an image system to capture images of rear seats of the vehicle to determine the presence of the at least one rear seat passenger;
   deactivate the image system to cease capturing images of the rear seats of the vehicle, wherein deactivating of the image system occurs when the vehicle is determined to be taken out of a park transmission mode;
   reactivate the image system to capture images of the rear seats of the vehicle to determine the presence of the at least one rear seat passenger, wherein reactivating the image system occurs when the vehicle is determined to be stopped for a predetermined period of time as the vehicle continues to be out of the park transmission mode, wherein a detection indication data flag that includes at least one determined location of the at least one rear seat passenger is stored based on data provided by the image system upon determining the vehicle is put into the park transmission mode from another transmission mode as the vehicle is enabled; and
   present a user interface notification that includes a video feed of the rear seats of the vehicle based on the determined presence of the at least one rear seat passenger, wherein the user interface notification is disabled upon determining that at least one rear vehicle door is opened within a predetermined period of time that is located near at least one seat in which the presence of the at least one rear seat passenger is detected based on an analysis of the detection indication flag.

11. The system of claim 10, wherein activating the image system occurs when the at least one rear door of the vehicle is determined to be opened and closed before an ignition of the vehicle is enabled.

12. The system of claim 10, wherein deactivating the image system includes ceasing the determination of the presence of the at least one rear seat passenger when the vehicle is taken out of the park transmission mode and the vehicle is in a state of movement.

13. The system of claim 10, further including deactivating the image system when it is determined that the vehicle is in a state of movement after the vehicle is determined to be stopped for the predetermined period of time.

14. The system of claim 10, further including storing the detection indication data flag when the presence of the at least one rear seat passenger is detected within the vehicle.

15. The system of claim 14, wherein presenting the user interface notification includes accessing the detection indication data flag upon determining that the vehicle is put in the park transmission mode and analyzing the detection indication data flag and determining that the at least one rear seat passenger is determined to be present within the vehicle.

16. The system of claim 15, wherein the video feed is presented with at least one rear seat of the vehicle as highlighted over at least one location where the at least one rear seat passenger is determined to be located, wherein the user interface notification also includes a user interface notification warning.

17. The system of claim 16, wherein it is determined that the ignition of the vehicle is disabled and the video feed is presented with the at least one rear seat of the vehicle as highlighted over at least one location where the at least one rear seat passenger is determined to be located, wherein the user interface notification also includes the user interface notification warning, an audio warning, and a dismiss user interface input that dismisses the user interface notification upon input.

18. The system of claim 14, further including storing a non-detection indication data flag when the presence of the at least one rear seat passenger is not detected within the vehicle, wherein the non-detection indication data flag is a different data flag than the detection indication data flag, wherein presenting the user interface notification includes determining that the rear seats of the vehicle are unoccupied based on retrieval of the non-detection indication data flag, wherein it is determined that the ignition of the vehicle is disabled and the video feed is presented to include the rear seats of the vehicle, wherein the user interface notification also includes a user interface notification warning, an audio warning, and a dismiss user interface input.

19. A non-transitory computer readable storage medium storing instructions that when executed by a computer, which includes a processor perform a method, the method comprising:
    activating an image system to capture images of rear seats of a vehicle to determine a presence of at least one rear seat passenger;
    deactivating the image system to cease capturing images of the rear seats of the vehicle, wherein deactivating of the image system occurs when the vehicle is determined to be taken out of a park transmission mode;
    reactivating the image system to capture images of the rear seats of the vehicle to determine the presence of the at least one rear seat passenger, wherein reactivating the image system occurs when the vehicle is determined to be stopped for a predetermined period of time as the vehicle continues to be out of the park transmission mode, wherein a detection indication data flag that includes at least one determined location of the at least one rear seat passenger is stored based on data provided by the image system upon determining the vehicle is put into the park transmission mode from another transmission mode as the vehicle is enabled; and
    presenting a user interface notification that includes a video feed of the rear seats of the vehicle based on the determined presence of the at least one rear seat passenger, wherein the user interface notification is disabled upon determining that at least one rear vehicle door is opened within a predetermined period of time that is located near at least one seat in which the presence of the at least one rear seat passenger is detected based on an analysis of the detection indication flag.

20. The non-transitory computer readable storage medium of claim 19, further including deactivating the image system when it is determined that the vehicle is in a state of movement after the vehicle is determined to be stopped for the predetermined period of time.

\* \* \* \* \*